(12) United States Patent
Iyer et al.

(10) Patent No.: US 8,717,882 B2
(45) Date of Patent: May 6, 2014

(54) REPURPOSING DATA LANE AS CLOCK LANE BY MIGRATING TO REDUCED SPEED LINK OPERATION

(75) Inventors: Venkatraman Iyer, Austin, TX (US); Robert G. Blankenship, Tacoma, WA (US); Allen J. Baum, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 481 days.

(21) Appl. No.: 13/175,798

(22) Filed: Jul. 1, 2011

(65) Prior Publication Data

US 2013/0007502 A1 Jan. 3, 2013

(51) Int. Cl.
*H04J 3/06* (2006.01)
(52) U.S. Cl.
USPC .......................................................... 370/228

(58) Field of Classification Search
CPC ........................................................ H04J 3/0688
USPC .......................................................... 370/228
See application file for complete search history.

(56) References Cited

U.S. PATENT DOCUMENTS

| 7,219,220 B2 * | 5/2007 | Cherukuri et al. ................. 713/2 |
| 7,362,739 B2 * | 4/2008 | Cherukuri et al. ............. 370/342 |
| 2005/0043910 A1 * | 2/2005 | Knebel et al. ................. 702/106 |
| 2010/0061497 A1 * | 3/2010 | Buchmann et al. ........... 375/371 |

* cited by examiner

*Primary Examiner* — Melvin Marcelo
(74) *Attorney, Agent, or Firm* — Caven & Aghevli LLC

(57) ABSTRACT

Methods and apparatus relating to repurposing a data lane as a clock lane by migrating to reduced speed link operation are described. In one embodiment, speed of a link is reduced upon detection of failure on a clock lane of the link and one of a plurality of data lanes of a link is repurposed as a replacement clock lane. Other embodiments are also disclosed and claimed.

20 Claims, 5 Drawing Sheets

REPURPOSING DATA LANE AS CLOCK LANE BY MIGRATING TO REDUCED SPEED LINK OPERATION

FIELD

The present disclosure generally relates to the field of electronics. More particularly, some embodiments relate to repurposing a data lane as a clock lane by migrating to reduced speed link operation.

BACKGROUND

Computer systems are made up of components that may communicate with one another for various purposes. Links that interconnect computer components may provide a mechanism for transferring data and clock signals between the components. Also, each link generally includes a plurality of lanes.

High reliability links are generally expected to function in the face of one or more lane failures (such as a clock lane failure). This may be done by repurposing a data lane as a clock lane (also referred to as clock failover). However, a repurposed data lane, when used as a clock lane, may result in marginal electrical behavior. Alternatively, some designs may utilize a redundant clock lane which is used in response to failure of a primary clock lane. Clearly, such approaches pose issues with respect to operational correctness/efficiency, additional silicon real estate requirements, and/or extra power consumption by the additional circuitry.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, some embodiments may be practiced without the specific details. In other instances, well-known methods, procedures, components, and circuits have not been described in detail so as not to obscure the particular embodiments. Various aspects of embodiments of the invention may be performed using various means, such as integrated semiconductor circuits ("hardware"), computer-readable instructions organized into one or more programs ("software") or some combination of hardware and software. For the purposes of this disclosure reference to "logic" shall mean either hardware, software, or some combination thereof.

In some implementations, clock failover may result in one of two data lanes being used as a clock lane at the pre-failover clock speed. However, a repurposed data lane, when used as a clock lane, may result in marginal electrical behavior of the link. The marginal behavior of the link during clock failover may be due to data lane circuits and/or interconnects not being optimized to work as clock lanes at high speeds.

Some of the embodiments discussed herein may provide for repurposing a data lane as a clock lane by migrating to a reduced speed link operation. In an embodiment, both sides of a serial link are geared down to a lower speed (e.g., half speed) and without losing synchronization when the clock lane is switched from a primary lane to a repurposed data lane. Accordingly, highly reliable interconnect systems (such as Quick Path Interconnect (QPI) systems) may tolerate clock failure without adding a dedicated back up clock lane by downgrading a link to a lower speed and using a data lane (e.g., from an unused portion of a link) to derive a backup clock lane.

Figure 1:
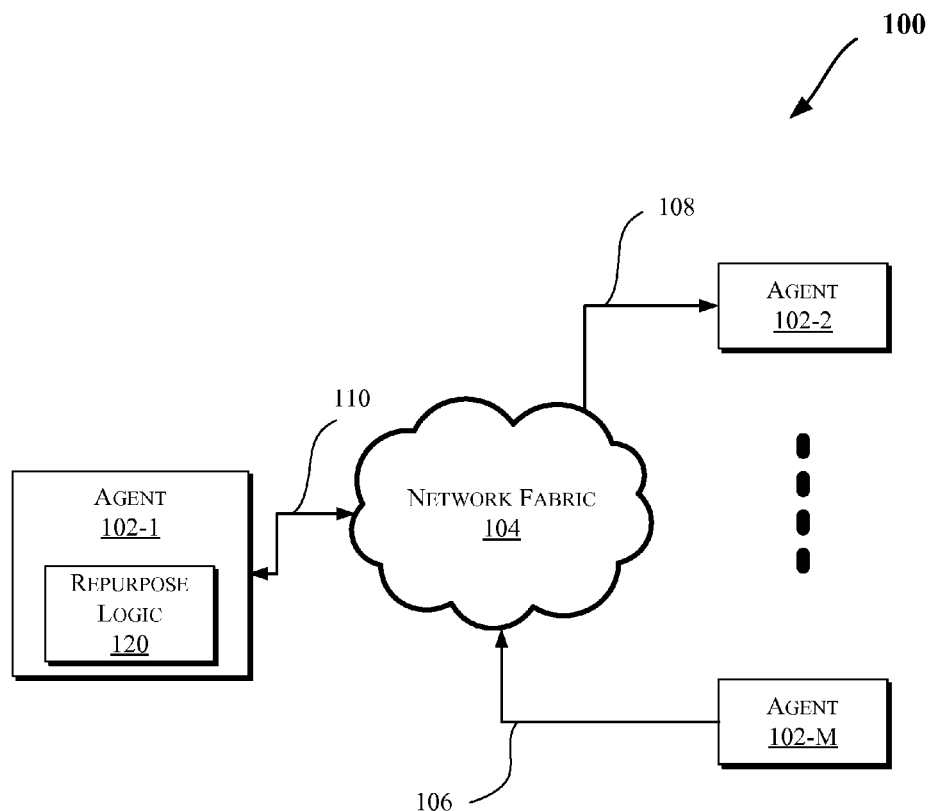
FIGS. 1-2 and 4-5 illustrate block diagrams of embodiments of computing systems, which may be utilized to implement various embodiments discussed herein.

Various embodiments are discussed herein with reference to a computing system component, such as the components discussed herein, e.g., with reference to FIGS. 1-2 and 4-5. More particularly, FIG. 1 illustrates a block diagram of a computing system 100, according to an embodiment of the invention. The system 100 may include one or more agents 102-1 through 102-M (collectively referred to herein as "agents 102" or more generally "agent 102"). In an embodiment, the agents 102 may be components of a computing system, such as the computing systems discussed with reference to FIGS. 2 and 4-5.

As illustrated in FIG. 1, the agents 102 may communicate via a network fabric 104. In an embodiment, the network fabric 104 may include one or more interconnects (or interconnection networks) that communicate via a serial (e.g., point-to-point) link and/or a shared communication network. For example, some embodiments may facilitate component debug or validation on links that allow communication with fully buffered dual in-line memory modules (FBD), e.g., where the FBD link is a serial link for coupling memory modules to a host controller device (such as a processor or memory hub). Debug information may be transmitted from the FBD channel host such that the debug information may be observed along the channel by channel traffic trace capture tools (such as one or more logic analyzers).

In one embodiment, the system 100 may support a layered protocol scheme, which may include a physical layer, a link layer, a routing layer, a transport layer, and/or a protocol layer. The fabric 104 may further facilitate transmission of data (e.g., in form of packets) from one protocol (e.g., caching processor or caching aware memory controller) to another protocol for a point-to-point network. Also, in some embodiments, the network fabric 104 may provide communication that adheres to one or more cache coherent protocols.

Furthermore, as shown by the direction of arrows in FIG. 1, the agents 102 may transmit and/or receive data via the network fabric 104. Hence, some agents may utilize a unidirectional link while others may utilize a bidirectional link for communication. For instance, one or more agents (such as agent 102-M) may transmit data (e.g., via a unidirectional link 106), other agent(s) (such as agent 102-2) may receive data (e.g., via a unidirectional link 108), while some agent(s) (such as agent 102-1) may both transmit and receive data (e.g., via a bidirectional link 110).

Also, in accordance with an embodiment, one or more of the agents 102 may include a repurposing logic 120 to detect clock lane failure and to cause a data lane to be repurposed as a clock lane as discussed herein. In some embodiments, one or more components of a multi-agent system (such as processor core, chipset, input/output hub, memory controller, etc.) may include a logic 120 as will be further discussed with reference to the remaining figures.

Figure 2:
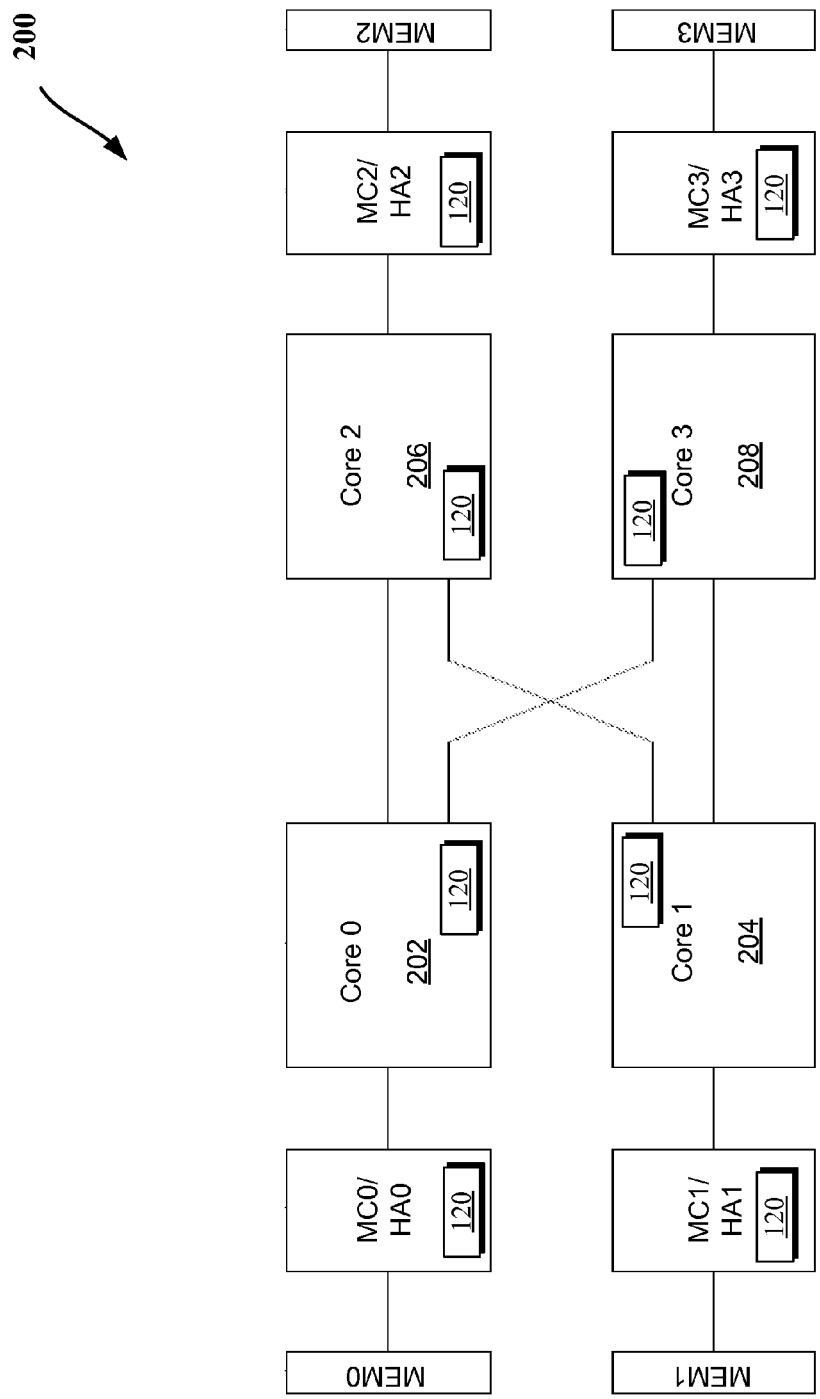

More specifically, FIG. 2 is a block diagram of a computing system 200 in accordance with an embodiment. System 200 may include a plurality of sockets 202-208 (four shown but some embodiments may have more or less socket). Each socket may include a processor and a logic 120. In some embodiments, logic 120 may be present in one or more components of system 200 (such as those shown in FIG. 2). However, more or less logic 120 blocks may be present in a system depending on the implementation. Also, each socket may be coupled to the other sockets via a point-to-point (PtP) link, such as a Quick Path Interconnect (QPI). As discussed with respect the network fabric 104 of FIG. 1, each socket may be coupled to a local portion of system memory, e.g., formed of a plurality of Dual Inline Memory Modules (DIMMs) that may include dynamic random access memory (DRAM).

As shown in FIG. 2, each socket may be coupled to a memory controller (MC)/Home Agent (HA) (such as MC0/HA0 through MC3/HA3). The memory controllers may be coupled to a corresponding local memory (labeled as MEM0 through MEM3), which may be a portion of system memory (such as memory 412 of FIG. 4). In some embodiments, the memory controller (MC)/Home Agent (HA) (such as MC0/HA0 through MC3/HA3) may be the same or similar to agent 102-1 of FIG. 1 and the memory, labeled as MEM0 through MEM3, may be the same or similar to memory discussed with reference to any of the figures herein. Generally, processing/caching agents may send requests to a home node for access to a memory address with which a corresponding "home agent" is associated. Also, in one embodiment, MEM0 through MEM3 may be configured to mirror data, e.g., as master and slave. Also, one or more components of system 200 may be included on the same integrated circuit die in some embodiments.

Furthermore, one implementation (such as shown in FIG. 2) may be for a socket glueless configuration with mirroring. For example, data assigned to a memory controller (such as MCO/HA0) may be mirrored to another memory controller (such as MC3/HA3) over the PtP links.

Figure 3:
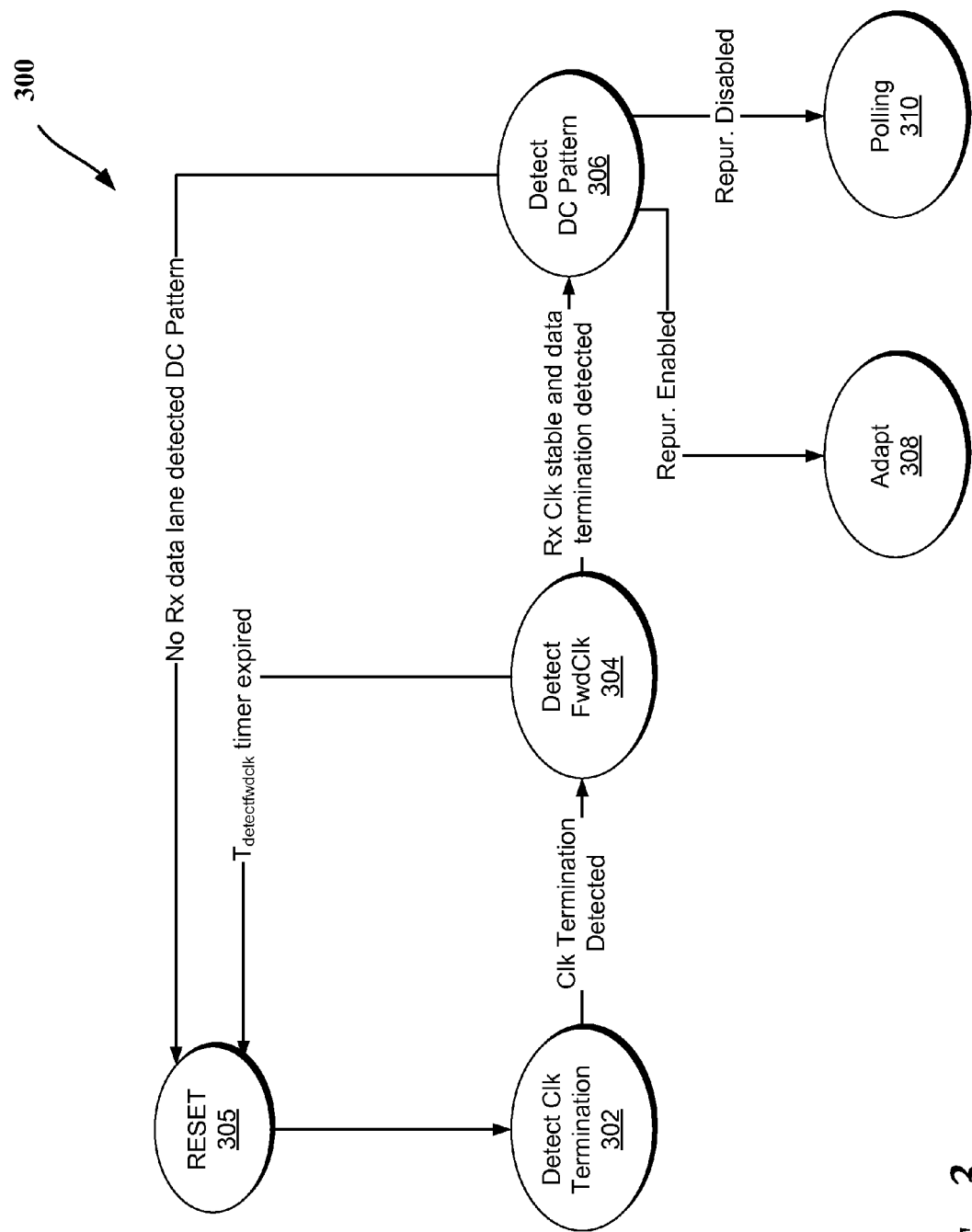
FIG. 3 illustrates a state diagram in accordance with an embodiment of the invention.

FIG. 3 illustrates a state diagram 300 in accordance with an embodiment. The state diagram of FIG. 3 shows various states that may be implemented by the logic 120 discussed with reference to the other figures.

In an embodiment, the link that couples a first agent and a second agent (such as discussed with reference to FIGS. 1-2) may include a plurality of data lanes to communicate data and at least one clock lane to transmit a clock signal between the first agent and the second agent. The logic 120 may detect poor clock signal on the clock lane (e.g., due to signal degradation, physical link errors, transmission errors, loss of synchronization, etc.) and the logic 120 may repurpose one of the plurality of data lanes as a replacement clock lane in response to a determination that operation of the at least one clock lane has failed. Additionally, logic 120 may cause reduction in the transmission speed of the link prior to transmission of the clock signal over the replacement clock lane, e.g., to reduce marginal electrical behavior of the link as discussed previously.

Embodiments for high speed signaling often includes terminations (pullup and pulldown resistors) to achieve good signal quality. Some embodiments could additionally use these terminations for handshake signaling at a slow rate (e.g. local pullup could be used to signal logic '1'; a stronger remote pulldown could change that to a logic '0'). Referring to FIG. 3, at a block 302, the logic 120 may detect presence of the other side by looking for its local pullup on a clock lane to be overpowered by a remote pulldown. This would cause both sides to go to block 304. At block 304, the local port may activate a forwarded clock and begin looking for the received clock from the remote port. If a forwarded clock is detected at block 304 (e.g., together with a determination that the receive clock is stable), a handshake (described above) on the data lanes causes both sides to enter block 306. Detection of a DC pattern on the data lanes is initiated at a block 306, followed by polling operation at block 310 to effect interactive training. For example, during polling operation 310, the two interconnected agents may exchange information regarding the disabled lane. In one embodiment, upon completion of the polling operation 310, information acquired during polling is used to configure the link. For example, some of the lanes of the link may be disabled due to faulty lanes or as a part of a power saving scheme or the lanes may be used as alternate clock lane as described herein.

If at the end of some specified time (e.g., expiration of a $T_{detectfwdclk}$ timer) in block 304, the received clock is not of adequate quality (e.g. specified frequency, amplitude, duty cycle, etc.), the local port abandons the initialization sequence and resets to block 305. If repurposing is enabled, one of the plurality of data lanes is tried as a replacement clock lane at block 302. Accordingly, some embodiments (e.g., through the use of state machine(s), logic, command(s), and/or register(s)) cause a link to operate at a lower (e.g., half) speed to improve the link margins and enable repurposing of a data lane as a clock lane without losing synchronization. In such cases after handshaking good quality (albeit slower speed) clock in block 304, the two agents go to block 306 and then may go to block 308. In block 308, the two agents recondition (e.g., equalize) the link in both directions for the slower speed operation. Subsequent initialization (e.g., reset, polling) proceeds same as before (albeit at slower speed). Some embodiments may opt to do some or all of the reconditioning with stored values (typically when in block 305) for the slower speed link instead of reconditioning the link in block 308.

Figure 4:
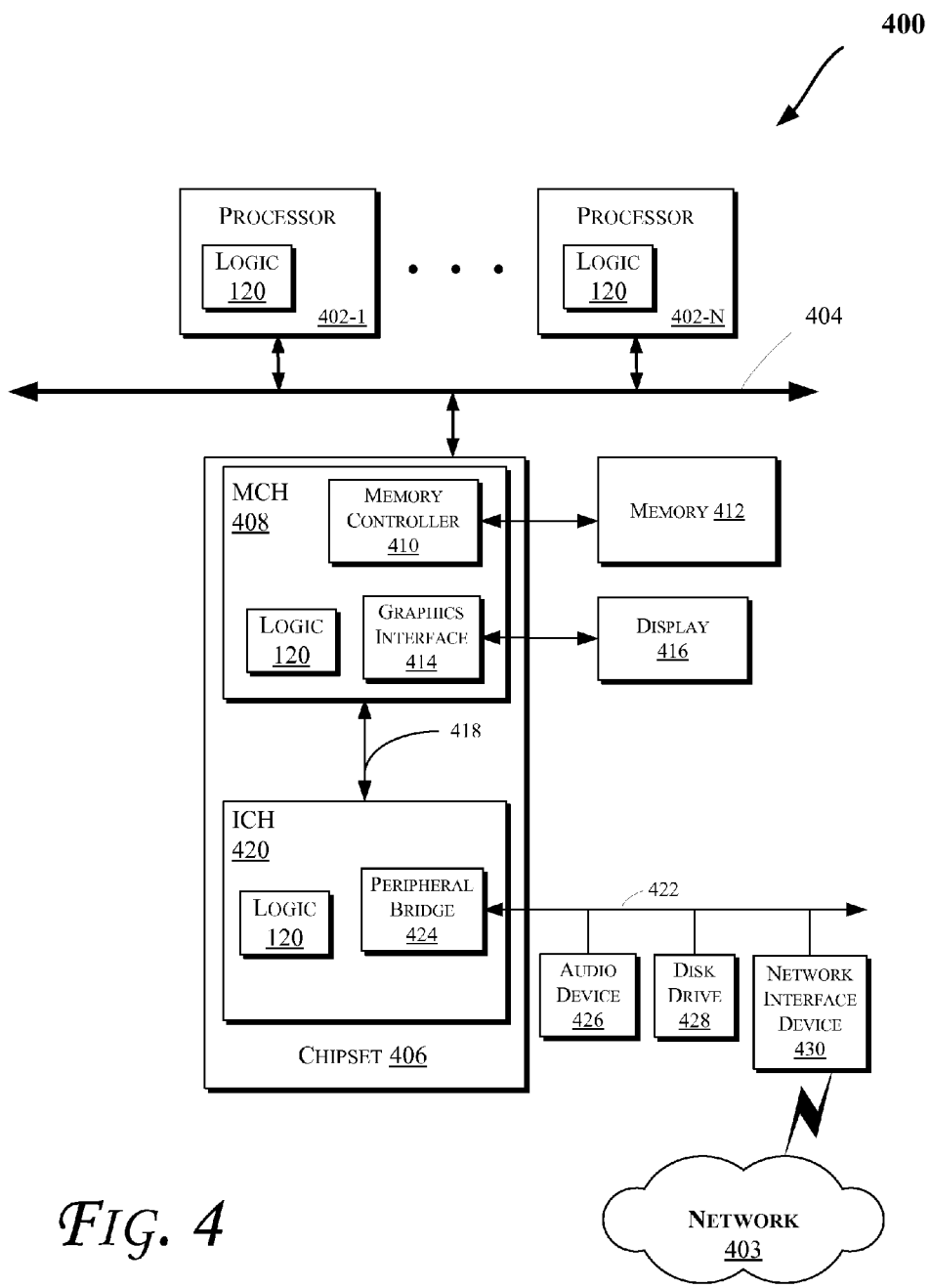

FIG. 4 illustrates a block diagram of a computing system 400 in accordance with an embodiment of the invention. The computing system 400 may include one or more central processing unit(s) (CPUs) 402-1 through 402-N or processors (collectively referred to herein as "processors 402" or more generally "processor 402") that communicate via an interconnection network (or bus) 404. The processors 402 may include a general purpose processor, a network processor (that processes data communicated over a computer network 403), or other types of a processor (including a reduced instruction set computer (RISC) processor or a complex instruction set computer (CISC)). Moreover, the processors 402 may have a single or multiple core design. The processors 402 with a multiple core design may integrate different types of processor cores on the same integrated circuit (IC) die. Also, the processors 402 with a multiple core design may be implemented as symmetrical or asymmetrical multiprocessors. Also, the operations discussed with reference to FIGS. 1-3 may be performed by one or more components of the system 400. In some embodiments, the processors 402 may be the same or similar to the processors 202-208 of FIG. 2. Furthermore, the processors 402 (or other components of the system 400) may include the logic 120.

A chipset 406 may also communicate with the interconnection network 404. The chipset 406 may include logic 120. The chipset 406 may include a memory controller hub (MCH) 408. The MCH 408 may include a memory controller 410 that communicates with a memory 412. The memory 412 may store data, including sequences of instructions that are executed by the CPU 402, or any other device included in the computing system 400. For example, the memory 412 may store data corresponding to an operation system (OS). In one embodiment of the invention, the memory 412 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 404, such as multiple CPUs and/or multiple system memories.

Additionally, one or more of the processors 402 may have access to one or more caches (which may include private and/or shared caches in various embodiments) and associated cache controllers (not shown). The cache(s) may adhere to one or more cache coherent protocols. The cache(s) may store data (e.g., including instructions) that are utilized by one or more components of the system 400. For example, the cache may locally cache data stored in a memory 412 for faster access by the components of the processors 402. In an embodiment, the cache (that may be shared) may include a mid-level cache and/or a last level cache (LLC). Also, each processor 402 may include a level 1 (L1) cache. Various components of the processors 402 may communicate with the cache directly, through a bus or interconnection network, and/or a memory controller or hub. Also, each of the processors 402 (or each core present in the processors 402) may include the logic 120 in some embodiments.

The MCH 408 may also include a graphics interface 414 that communicates with a display device 416, e.g., via a graphics accelerator. In one embodiment of the invention, the graphics interface 414 may communicate with the graphics accelerator via an accelerated graphics port (AGP). In an embodiment of the invention, the display 416 (such as a flat panel display) may communicate with the graphics interface 414 through, for example, a signal converter that translates a digital representation of an image stored in a storage device such as video memory or system memory into display signals that are interpreted and displayed by the display 416. The display signals produced by the display device may pass through various control devices before being interpreted by and subsequently displayed on the display 416.

A hub interface 418 may allow the MCH 408 and an input/output control hub (ICH) 420 to communicate. The ICH 420 may provide an interface to I/O devices that communicate with the computing system 400. The ICH 420 may communicate with a bus 422 through a peripheral bridge (or controller) 424, such as a peripheral component interconnect (PCI) bridge, a universal serial bus (USB) controller, or other types of peripheral bridges or controllers. The bridge 424 may provide a data path between the CPU 402 and peripheral devices. Other types of topologies may be utilized. Also, multiple buses may communicate with the ICH 420, e.g., through multiple bridges or controllers. Moreover, other peripherals in communication with the ICH 420 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 422 may communicate with an audio device 426, one or more disk drive(s) 428, and a network interface device 430 (which is in communication with the computer network 403). Other devices may communicate via the bus 422. Also, various components (such as the network interface device 430) may communicate with the MCH 408 in some embodiments of the invention. In addition, the processor 402 and one or more components of the MCH 408 may be combined to form a single chip.

Furthermore, the computing system 400 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 428), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 5:
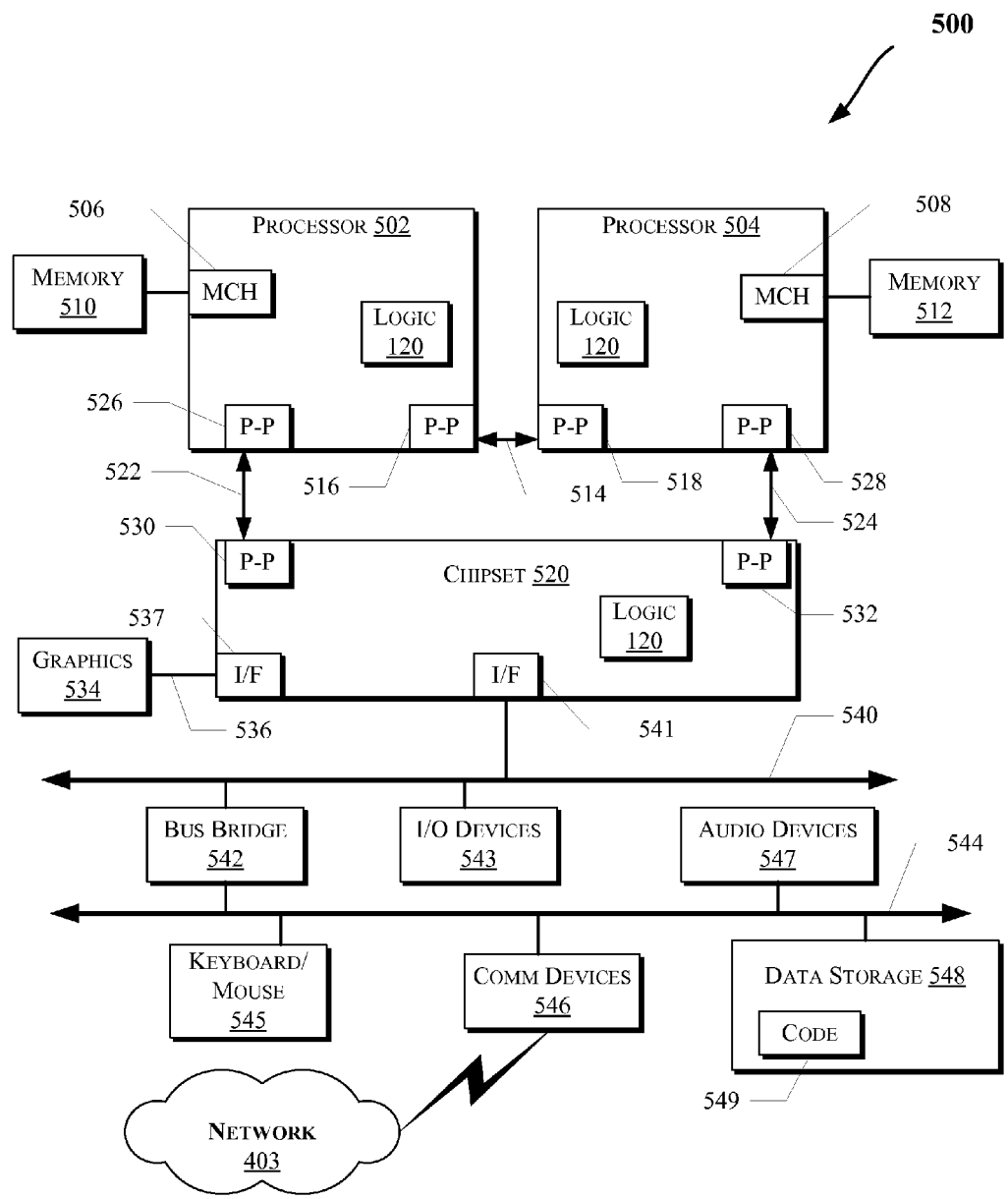

FIG. 5 illustrates a computing system 500 that is arranged in a point-to-point (PtP) configuration, according to an embodiment of the invention. In particular, FIG. 5 shows a system where processors, memory, and input/output devices are interconnected by a number of point-to-point interfaces. The operations discussed with reference to FIGS. 1-4 may be performed by one or more components of the system 500.

As illustrated in FIG. 5, the system 500 may include several processors, of which only two, processors 502 and 504 are shown for clarity. The processors 502 and 504 may each include a local memory controller hub (MCH) 506 and 508 to enable communication with memories 510 and 512. The memories 510 and/or 512 may store various data such as those discussed with reference to the memory 412 of FIG. 4. As shown in FIG. 5, the processors 502 and 504 may also include the cache(s) discussed with reference to FIG. 4.

In an embodiment, the processors 502 and 504 may be one of the processors 402 discussed with reference to FIG. 4. The processors 502 and 504 may exchange data via a point-to-point (PtP) interface 514 using PtP interface circuits 516 and 518, respectively. Also, the processors 502 and 504 may each exchange data with a chipset 520 via individual PtP interfaces 522 and 524 using point-to-point interface circuits 526, 528, 530, and 532. The chipset 520 may further exchange data with a high-performance graphics circuit 534 via a high-performance graphics interface 536, e.g., using a PtP interface circuit 537.

At least one embodiment of the invention may be provided within the processors 502 and 504 or chipset 520. For example, the logic 120 may be provided within the processors 502 and 504 (or within each core of the processors 502 and/or 504). Other embodiments of the invention, however, may exist in other circuits, logic units, or devices within the system 500 of FIG. 5. Furthermore, other embodiments of the invention may be distributed throughout several circuits, logic units, or devices illustrated in FIG. 5.

The chipset 520 may communicate with a bus 540 using a PtP interface circuit 541. The bus 540 may have one or more devices that communicate with it, such as a bus bridge 542 and I/O devices 543. Via a bus 544, the bus bridge 542 may communicate with other devices such as a keyboard/mouse 545, communication devices 546 (such as modems, network interface devices, or other communication devices that may communicate with the computer network 403), audio I/O device, and/or a data storage device 548. The data storage device 548 may store code 549 that may be executed by the processors 502 and/or 504.

In various embodiments of the invention, the operations discussed herein, e.g., with reference to FIGS. 1-5, may be implemented as hardware (e.g., circuitry), software, firmware, microcode, or combinations thereof, which may be provided as a computer program product, e.g., including a (e.g., non-transitory) machine-readable or (e.g., non-transitory) computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed with respect to FIGS. 1-5. Additionally, such computer-readable media may be downloaded as a computer program product, wherein the program may be transferred from a remote computer (e.g., a server) to a requesting computer (e.g., a client) by way of data signals transmitted via a carrier wave or other propagation medium via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. A processor comprising:
a first agent coupled to a second agent via a link, wherein the link is to comprise a plurality of data lanes to communicate data and at least one clock lane to transmit a clock signal between the first agent and the second agent and wherein one or more of the plurality of data lanes is to be repurposed as a replacement clock lane in response to a determination that operation of the at least one clock lane has failed; and
logic to cause reduction in a speed of the link prior to transmission of the clock signal over the replacement clock lane.

2. The processor of claim 1, wherein the logic is to detect a good quality clock signal transmission and indicate the detection to an opposite side of the link.

3. The processor of claim 2, wherein the link is to be reset upon expiration of a timer without detection of the good quality clock signal transmission.

4. The processor of claim 1, wherein the logic is to cause reconditioning of the link at slower speed prior to further initialization.

5. The processor of claim 1, wherein the first agent and the second agent are to comprise one of a processor core, a chipset, an input/output hub, or a memory controller.

6. The processor of claim 1, wherein the link is to comprise a point-to-point interconnect.

7. The processor of claim 1, wherein the processor is to comprise a plurality of processor cores.

8. The processor of claim 1, wherein the processor is to comprise a plurality of sockets.

9. The processor of claim 1, wherein one or more of the first agent, the second agent, and the logic are on a same integrated circuit chip.

10. A method comprising:
detecting whether a clock lane of a link between a first agent and a second agent has failed, wherein the link is to comprise a plurality of data lanes to communicate data and the clock lane to transmit a clock signal between the first agent and the second agent;
repurposing one of the plurality of data lanes as a replacement clock lane in response to a determination that operation of the clock lane has failed; and
reducing a speed of the link prior to transmission of the clock signal over the replacement clock lane.

11. The method of claim 10, further comprising causing detection of a good quality clock signal transmission and indicating the detection to an opposite side of the link.

12. The method of claim 10, further comprising resetting upon expiration of a timer without detection of the good quality clock signal transmission.

13. The method of claim 10, further comprising reconditioning of the link at slower speed prior to further initialization.

14. A computing system comprising:
a first processor core and a second processor core;
a point-to-point link to couple the first and second processor cores, wherein the link is to comprise a plurality of data lanes to communicate data and at least one clock lane to transmit a clock signal between the first processor core and the second processor core and wherein one of the plurality of data lanes is to be repurposed as a replacement clock lane in response to a determination that operation of the at least one clock lane has failed; and
logic to cause reduction in a speed of the link prior to transmission of the clock signal over the replacement clock lane.

15. The system of claim 14, wherein the logic is to detect a good quality clock signal transmission and indicate the detection to an opposite side of the link.

16. The system of claim 15, wherein the link is to be reset upon expiration of a timer without detection of the good quality clock signal transmission.

17. The system of claim 14, wherein the logic is to cause reconditioning of the link at slower speed prior to further initialization.

18. The system of claim 14, wherein one or more of the first processor core, the second processor core, and the logic are on a same integrated circuit chip.

19. The system of claim 14, further comprising a plurality of sockets coupled to the first and second processor cores.

20. The system of claim 14, wherein a first agent is to comprise the first processor core and the logic.

* * * * *